US010671272B2

(12) United States Patent
Liu et al.

(10) Patent No.: US 10,671,272 B2
(45) Date of Patent: Jun. 2, 2020

(54) TOUCHSCREEN ORIENTED INPUT INTEGRATED WITH ENHANCED FOUR-CORNER INDEXING

(71) Applicant: International Business Machines Corporation, Armonk, NY (US)

(72) Inventors: Su Liu, Austin, TX (US); Vettakkorumakankavu S. Umamaheswaran, Ajax (CA); Cheng Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 14/934,213

(22) Filed: Nov. 6, 2015

(65) Prior Publication Data

US 2017/0131890 A1 May 11, 2017

(51) Int. Cl.
*G06F 3/0488* (2013.01)
*G06F 3/023* (2006.01)
*G06F 3/01* (2006.01)

(52) U.S. Cl.
CPC ......... *G06F 3/04883* (2013.01); *G06F 3/018* (2013.01); *G06F 3/0233* (2013.01); *G06F 2203/04808* (2013.01)

(58) Field of Classification Search
CPC .... G06F 3/04883; G06F 3/0233; G06F 3/018; G06F 2203/04808
See application file for complete search history.

(56) References Cited

U.S. PATENT DOCUMENTS 6,301,626 B1  10/2001  Knox
6,356,866 B1  3/2002  Pratley et al.
(Continued)

FOREIGN PATENT DOCUMENTS

CN   101794182 A   8/2010
WO   2004006081 A2  1/2004
(Continued)

OTHER PUBLICATIONS

Wikipedia, "Character (Computing)," Wikipedia: the Free Encyclopedia, Last Modified on Mar. 4, 2015, p. 1-3, https://en.wikipedia.org/wiki/Character_(computing), Accessed on Oct. 27, 2015.
(Continued)

*Primary Examiner* — Sang H Kim
(74) *Attorney, Agent, or Firm* — Teddi E. Maranzano (57) ABSTRACT

A method, program product, and system for inputting Simplified and Traditional Chinese, Japanese, and Korean (CJK) characters into a touchscreen-enabled device is provided. The touchscreen-enabled device receives a plurality of finger touch events. Each of the plurality of finger touch events is a CJK text input stroke associated with a corner of the touchscreen-enabled device. A finger touch movement direction on the touchscreen-enabled device is determined for each of the plurality of finger touch events. In response to determining the finger touch movement direction, the finger touch movement direction associated with each of the plurality of finger touch events is converted to a numeric index value. The corner that is activated by each of the plurality of finger touch events is determined and associated to the numeric index value.

17 Claims, 5 Drawing Sheets

(56) References Cited

U.S. PATENT DOCUMENTS

| | | |
|---|---|---|
| 7,519,748 B2 | 4/2009 | Kuzmin |
| 8,094,940 B2 | 1/2012 | Chen et al. |
| 9,063,636 B2 | 6/2015 | Deng et al. |
| 9,069,446 B2 | 6/2015 | Deng et al. |
| 2002/0168107 A1* | 11/2002 | Tang ............... G06K 9/00429 382/187 |
| 2004/0223644 A1* | 11/2004 | Meurs ................. G06F 3/018 382/185 |
| 2007/0173240 A1 | 7/2007 | Lim |
| 2007/0298785 A1* | 12/2007 | Lee ..................... G06F 3/018 455/425 |
| 2008/0075368 A1* | 3/2008 | Kuzmin ........... G06F 3/04883 382/187 |
| 2010/0214216 A1* | 8/2010 | Nasiri .................. A63F 13/06 345/158 |
| 2010/0214250 A1* | 8/2010 | Gillespie ........... G06F 3/0481 345/173 |
| 2010/0245230 A1 | 9/2010 | Yaun |
| 2012/0019446 A1 | 1/2012 | Wu et al. |
| 2013/0154928 A1 | 6/2013 | Chang |
| 2013/0201155 A1 | 8/2013 | Wu et al. |
| 2014/0368439 A1* | 12/2014 | Nishimura ......... G06F 3/0234 345/169 |
| 2015/0040056 A1* | 2/2015 | Cho .................... G06F 3/018 715/773 |
| 2015/0346841 A1* | 12/2015 | Saratani ............ G06F 3/0233 345/169 |
| 2017/0206004 A1* | 7/2017 | De Bruyn ........... G06F 40/129 |

FOREIGN PATENT DOCUMENTS

| | | |
|---|---|---|
| WO | 2010141389 A2 | 12/2010 |
| WO | 2011113057 A1 | 9/2011 |
| WO | 2013135208 A1 | 9/2013 |
| WO | 2013189290 A1 | 12/2013 |

OTHER PUBLICATIONS

Wikipedia, "Character Encoding," Wikipedia: the Free Encyclopedia, Last Modified on Oct. 12, 2015, p. 1-8, https://en.wikipedia.org/wiki/Character_encoding, Accessed on Oct. 27, 2015.

Wikipedia, "Chinese Characters," Wikipedia: the Free Encyclopedia, Last Modified on Oct. 22, 2015, p. 1-32, https://en.wikipedia.org/wiki/Chinese_characters, Accessed on Oct. 27, 2015.

Wikipedia, "Chinese Input Methods for Computers," Wikipedia: the Free Encyclopedia, Last Modified on Oct. 3, 2015, p. 1-6, https://en.wikipedia.org/wiki/Chinese_input_methods_for_computers, Accessed on Oct. 27, 2015.

Wikipedia, "Four-Corner Method," Wikipedia: the Free Encyclopedia, Last Modified on May 21, 2015, p. 1-5, https://en.wikipedia.org/wiki/Four-Corner_Method, Accessed on Oct. 27, 2015.

Wikipedia, "Numerical Digit," Wikipedia: the Free Encyclopedia, Last Modified on Oct. 1, 2015, p. 1-9, https://en.wikipedia.org/wiki/Numerical_digit, Accessed on Oct. 27, 2015.

Wikipedia, "Pinyin," Wikipedia: the Free Encyclopedia, Last Modified on Oct. 25, 2015, p. 1-25, https://en.wikipedia.org/wiki/Pinyin, Accessed on Oct. 27, 2015.

Wikipedia, "Simplified Chinese Characters," Wikipedia: the Free Encyclopedia, Last Modified on Oct. 23, 2015, p. 1-16, https://en.wikipedia.org/wiki/Simplified_Chinese_characters, Accessed on Oct. 27, 2015.

Wikipedia, "Traditional Chinese Characters," Wikipedia: the Free Encyclopedia, Last Modified on Oct. 13, 2015, p. 1-5, https://en.wikipedia.org/wiki/Traditional_Chinese_characters, Accessed on Oct. 27, 2015.

* cited by examiner

FIGURE 1

| 号码<br>Numeric Index Value | 指向<br>Touch Finger Movement Direction | 偏旁名称<br>Stroke Name | 偏旁<br>Stroke | 频度*<br>Frequency | 例子<br>Example |
|---|---|---|---|---|---|
| 0 | ↳ | 头 | 亠 | 6570 | 文/04 刘/024 |
| 1 | → | 横 | 一乚 | 8634 | 王/1010 |
| 2 | ↓ | 垂 | 丨丿 | 9716 | 顺/2108 徐/2829 |
| 3 | ↘ | 点 | ⟲ | 5350 | 之/3030 |
| 4 | ↙ | 叉 | 十乂 | 7748 | 共/448 |
| 5 | ↑ | 插 | 未 | 3550 | 打/5102 |
| 6 | ← | 方 | 口 | 4611 | 吕/6060 |
| 7 | ⌐↓ | 角 | 冂一 | 5649 | 马/7712 |
| 8 | ↗ | 八 | 小ヾ人 | 4847 | 全/8010 |
| 9 | ↖ | 小 | 小ヾ | 3698 | 情/9502 |
| enter | ↻ | | | | |
| undo | ↺ | | | | |
| *Based on frequency analysis on 17137 Four-Corner Index data | | | | | |

TOUCHSCREEN ORIENTED INPUT INTEGRATED WITH ENHANCED FOUR-CORNER INDEXING

BACKGROUND

Embodiments of the present invention relate generally to the field of computer touchscreen devices, and more particularly to touchscreen oriented input integrated with enhanced four-corner indexing.

In most mobile devices, such as phones, smartwatches and tablets, data is input using a small virtual keyboard on the touchscreen. The keyboard layout is called QWERTY because it is based on the names of the first six keys appearing on the top left letter row of the traditional keyboard for Latin script. An input method editor (IME) is an operating system component, or another program, that is commonly used to accept data input, such as from keyboard strokes or mouse movements. An IME allows a user to enter characters and symbols not found on the input device. With an IME, a user of a Latin keyboard can input Simplified and Traditional Chinese, Japanese, Korean (CJK) characters using the touchscreen of the mobile device. However, since traditional IMEs are designed for full-sized keyboards it is difficult to operate the virtual keyboard of a typical mobile device. Some non-keyboard layout-based input methods (such as hand writing and voice) can be used in mobile devices without the screen size limitation. However, the efficiency and accuracy of such methods are still bottlenecks for CJK graphic characters inputs.

A new touch-device oriented IME that does not rely on a virtual QWERTY keyboard may increase IME efficiency and accuracy, and by eliminating the original IME drawbacks of error introduced by the small QWERTY keyboard and the difficult and time consuming process of entering CJK characters.

SUMMARY

A method for inputting Simplified and Traditional Chinese, Japanese, and Korean (CJK) characters into a touchscreen-enabled device is provided. The method includes receiving a plurality of finger touch events on the touchscreen-enabled device, whereby each of the plurality of finger touch events is a CJK text input stroke associated with a corner of the touchscreen-enabled device. The method determines a finger touch movement direction on the touchscreen-enabled device for each of the plurality of finger touch events. In response to determining the finger touch movement direction, the method converts the finger touch movement direction associated with each of the plurality of finger touch events to a numeric index value. The method determines a corner on the touchscreen-enabled device that is activated by each of the received plurality of finger touch events, and searches a four-corner index-character dictionary for a matching CJK character using a content of an index buffer.

A computer program product for inputting Simplified and Traditional Chinese, Japanese, and Korean (CJK) characters into a touchscreen-enabled device is provided. The computer program product includes an input method editor (IME) on the touchscreen-enabled device embodied on a computer readable storage medium. The IME includes program instructions executable by a processor, including program instructions to receive, by the IME, a plurality of finger touch events on the touchscreen-enabled device, whereby each of the plurality of finger touch events is a CJK text input stroke associated with a corner of the touchscreen-enabled device. The computer program product includes program instructions to determine, by the IME, a finger touch movement direction on the touchscreen-enabled device for each of the plurality of finger touch events. In response to program instructions to determine the finger touch movement direction, the computer program product converts the finger touch movement direction associated with each of the plurality of finger touch events to a numeric index value. Program instructions determine a corner on the touchscreen-enabled device that is activated by each of the received plurality of finger touch events. Program instructions search a four-corner index-character dictionary for a matching CJK character using a content of an index buffer.

A computer system for inputting Simplified and Traditional Chinese, Japanese, and Korean (CJK) characters into a touchscreen-enabled device is provided. The computer system includes one or more processors, one or more computer-readable storage devices, and an input method editor (IME) including a plurality of program instructions stored on at least one of the one or more storage devices for execution by at least one of the one or more processors. The plurality of program instructions include program instructions to receive, by the IME, a plurality of finger touch events on the touchscreen-enabled device, wherein each of the plurality of finger touch events is a CJK text input stroke associated with a corner of the touchscreen-enabled device. Program instructions determine, by the IME, a finger touch movement direction on the touchscreen-enabled device for each of the plurality of finger touch events. In response to program instructions to determine the finger touch movement direction, program instructions convert the finger touch movement direction associated with each of the plurality of finger touch events to a numeric index value. Program instructions determine a corner on the touchscreen-enabled device that is activated by each of the received plurality of finger touch events. Program instructions to search a four-corner index-character dictionary for a matching CJK character using a content of an index buffer.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/ or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

Embodiments of the present invention relate generally to the field of computer touchscreen devices, and more particularly to touchscreen oriented input integrated with enhanced four-corner indexing.

The following described exemplary embodiments provide a system, method and program product having the capacity to improve the technical field of touchscreen based Simplified and Traditional Chinese, Japanese, and Korean (CJK) input by eliminating the requirement for a virtual QWERTY keyboard. It is not necessary to remember numeric-to-character mapping rules because all finger movements are basically those of non-touchscreen stroke-drawing directions. The average number of strokes is reduced because a default input has been defined in each corner so that default strokes can be skipped. Although presented in terms of CJK characters, the algorithm, components and IME described in FIGS. 1-5 can be adapted for inputting any ideographic language or scripts. In this context, ideographic refers to a writing system whereby a symbol represents a concept, idea, or object rather than a word or sound.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

Figure 1:
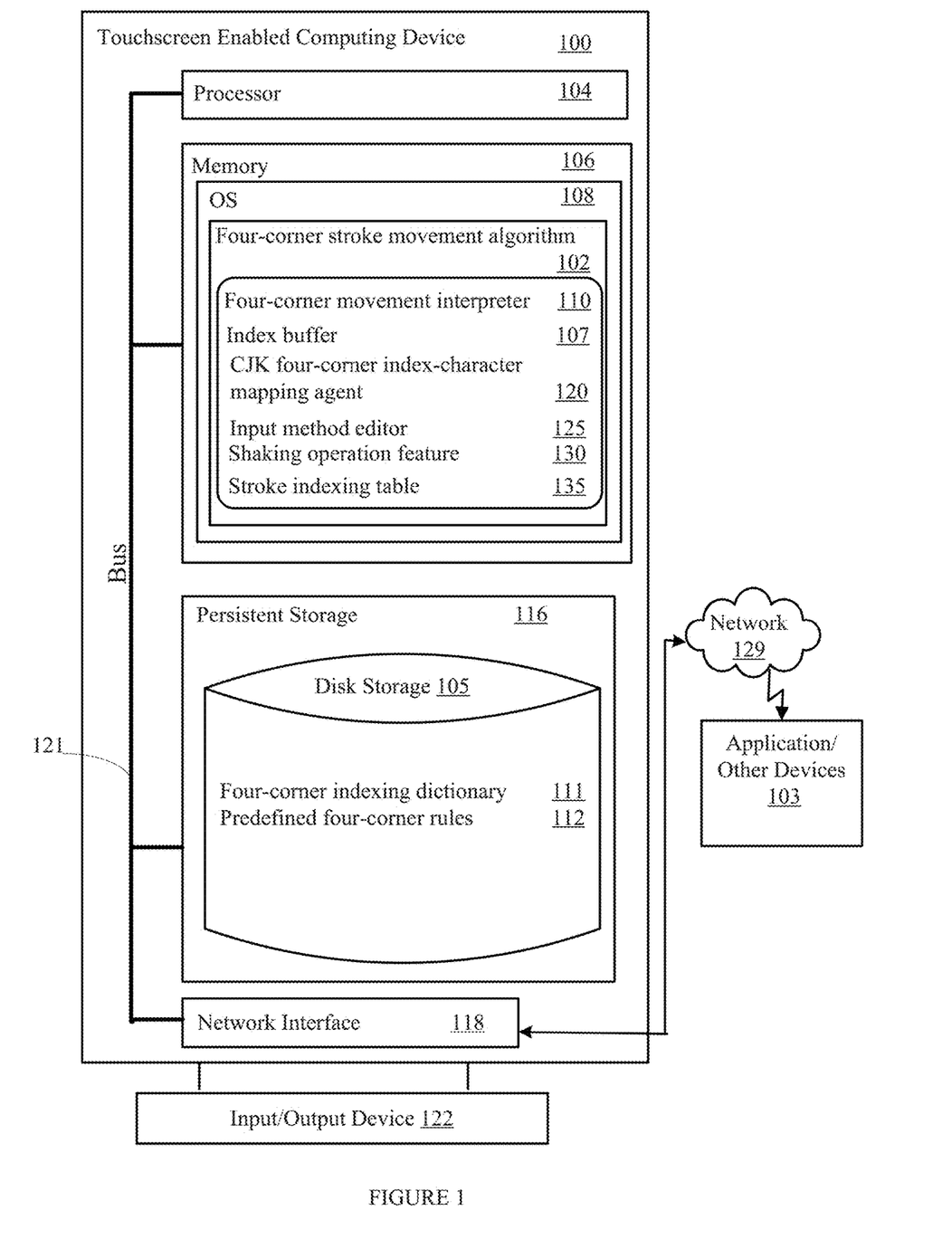
FIG. 1 illustrates an exemplary touchscreen enabled device environment operable for various embodiments of the disclosure.

FIG. 1 illustrates a block diagram of an exemplary computer system operable for various embodiments of the disclosure. In this illustrative example, the data processing system includes a touchscreen-enabled computing device (device) 100 providing a four-corner stroke movement algorithm 102. The device 100 may be connected to other applications and computers via a network 129. The device 100 includes any touchscreen-enabled device, such as computer monitors. Each of the four corners of a computer monitor may receive CJK stroke input in the four-corner stroke movement algorithm 102. Alternatively, a defined virtualized portion of the computer monitor can emulate a four-corner device that receives CJK stroke input in the four-corner stroke movement algorithm 102. The device 100 includes mobile devices such as phones, tablets, and wearable computing devices such as smartwatches.

The device 100 includes a processor unit 104 that executes instructions for software, for example the operating system (OS) 108 and the four-corner stroke movement algorithm 102 (discussed in further detail with respect to FIG. 3) that may be loaded into memory 106. The processor unit 104 may be a set of one or more processors or may be a multi-processor core, depending on the particular implementation. Further, the processor unit 104 is connected, via a bus 121, to memory 106, a network interface device 118, disk storage 105, persistent storage 116, and input/output device 122.

The device 100 is generally under the control of an operating system OS 108 that supports the functions disclosed herein. The processor 104 is included to be representative of several implementation dependent architectures. Similarly, the memory 106 may be a random access or flash memory. The network interface device 118 may be any type of network communications device allowing the device 100 to communicate with other devices or applications 103 via a network 129.

Persistent storage 116 may be any device or hardware that is capable of storing information, such as data, an OS 108, and program instructions, including those providing the four-corner stroke movement algorithm 102. Persistent storage 116 may take various forms depending on the particular implementation. For example, persistent storage 116 may be disk storage 105, a flash memory, optical disk, or some combination of the above.

Instructions for the OS 108, the four-corner stroke movement algorithm 102, applications and/or programs may be located in persistent storage 116, which is in communication with processor unit 104 through the bus 121 fabric. In these illustrative examples the instructions are in a functional form on persistent storage 116. These instructions may be loaded into memory 106 for execution by processor unit 104. The input/output device 122 may be combined, as in a display screen with an integrated touchscreen.

The four-corner stroke movement algorithm 102 includes an input method editor (IME) 125 for aligning the physical layer of the touchscreen to the virtual layer of the CJK character's square. An IME is typically a software program that intercepts key presses and interprets them during text composition. When there is an ambiguity in the text input, the IME may display a candidate list from which the user may select a candidate character. The user selects the candidate character using an operation such as a finger tap or swipe or other suitable actions, which commits the character or composition. The IME passes the committed character to the application. A four-corner movement interpreter 110 determines which corner is activated and the direction of the movement. The four-corner movement interpreter 110 converts the finger movement and direction to a numeric index value using a stroke indexing table 135 to associate the finger touch event with a movement direction, and the movement direction to a numeric index value. An index buffer 107 stores each numeric index value until the CJK character construction is completed. When the character formation is completed, a CJK four-corner index-character mapping agent 120 searches for the completed character. Alternatively, the CJK four-corner index-character mapping agent 120 may search for a candidate character after each finger movement is converted to a numeric index value. For a hand-held device, a shaking operation feature 130 pages forward and backward through candidate character pages being displayed on the device 100. Alternatively, any finger motion such as swiping or tapping may be used to page. The shaking operation feature 130 may be enabled alone or concurrently with the finger motion paging. Thus, the user may switch from one paging method to another depending on which method is convenient at a particular time. Disk storage 105 may include a four-corner indexing dictionary 111 that stores the building blocks of the CJK characters. Disk storage 105 also may include predefined four-corner rules 112 by which a user may indicate which language or combination of CJK languages character processing is done.

Figure 2:
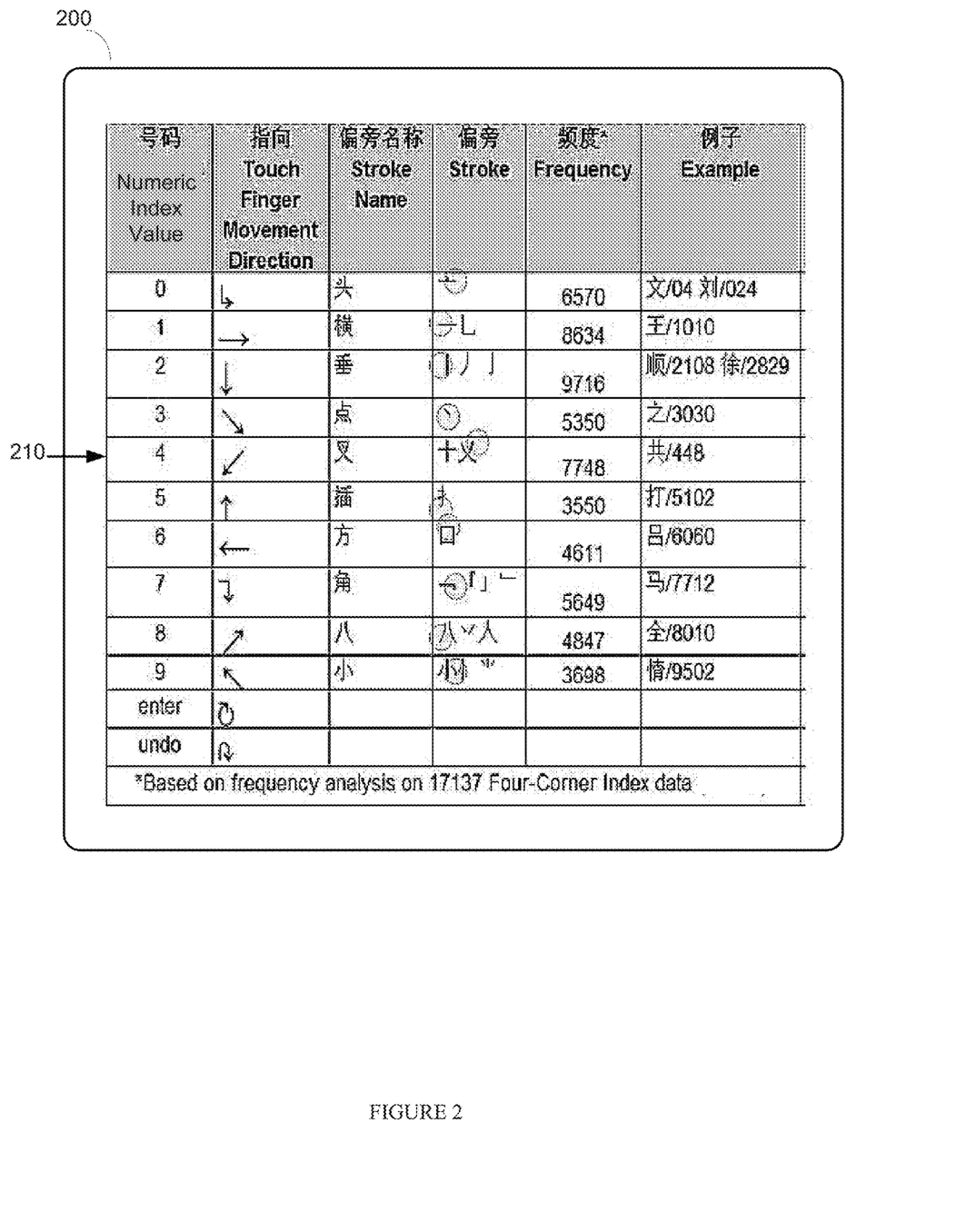
FIG. 2 illustrates stroke indexing, according to various embodiments of the disclosure.

FIG. 2 illustrates an example of a stroke indexing table. The four-corner lookup character method enables encoding CJK characters into a computer using four numerical digits, i.e., four numeric index values per character. The four digits encode the shapes of the outer four-corners of the symbol, from top-left to bottom-right. Although this may not uniquely identify a CJK character, it leaves only a short candidate list of possibilities. In some character sets, a fifth digit can be added to uniquely identify the character if necessary.

Figure 3:
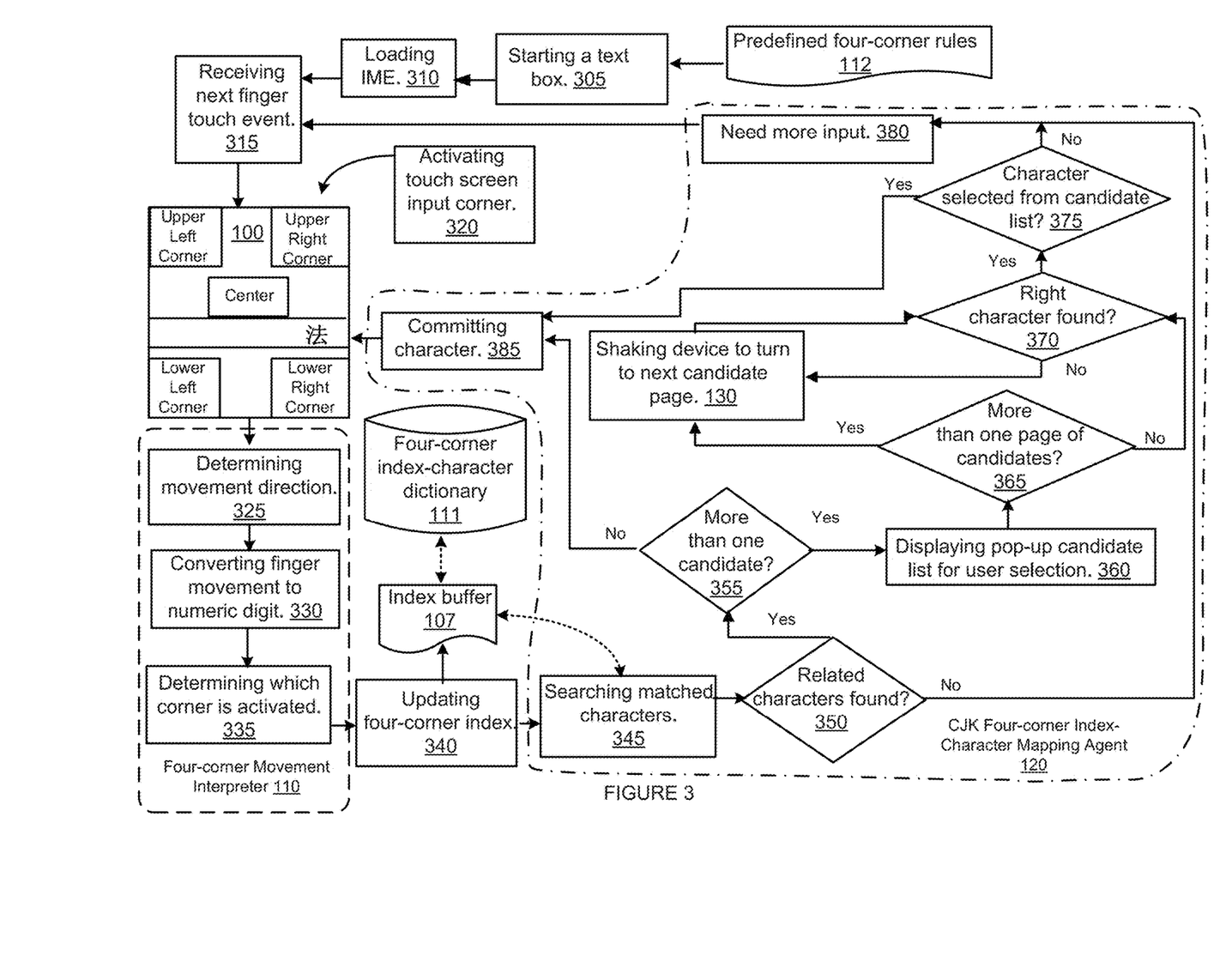
FIG. 3 illustrates components and algorithms associated with a touchscreen oriented input solution for enhanced four-corner indexing, according to various embodiments of the disclosure.

The numeric index value column assigns a value from 0-9 to correspond to each movement in the touch finger movement direction column. Each entry in the touch finger movement direction column corresponds to one of the strokes in the stroke column. The most defined finger tap movement directions are based on the nature of the CJK stroke. The IME 125 (FIG. 1) is enabled to map the CJK stroke to the movement direction of the finger touch event, and return a numeric index value that is used to search the four-corner indexing dictionary 111 (FIGS. 1 and 3). For example, the numeric "1" and the horizontal stroke bar "-", which also means one in Chinese, both associate to a left-to-right horizontal moving direction on a touchscreen-enabled IME. Therefore, a user new to CJK languages does not have to memorize numeric index to character mappings, but can focus on forming the character strokes on the touchscreen as if the character strokes were being formed on paper. The frequency column represents the how often that a particular stroke appears in the collected CJK characters. Just as several strokes comprise a CJK character, the several values can be used as an index to locate a CJK character in a dictionary, such as the four-corner indexing dictionary 111 of FIG. 1.

For example, the table entry 210 assigns a numeric index value "4," cross stroke, to the finger movement from the top-right corner to the bottom-left corner. An example of the stroke is shown in the stroke column. Based on statistical analysis, this stroke occurs 7748 times in the collected CJK characters. The individual stroke and finger tap move direction reference is shown in the stroke column. The circled portions of the strokes in the stroke column may assist in learning the finger tap movement direction based on the real strokes. The CJK character shown in the Example column is formed from two numeric index value "4" strokes and one numeric index value "8" stroke, thereby giving a final numeric index value of "448." Each movement in the touch finger movement direction column is paired with a stroke drawing style that is a component of the CJK character. This pairing is intuitive for experienced CJK users. The pairing simplifies the process of character formation for users who may be new to CJK languages by giving them fewer operations to remember to accurately input CJK characters.

FIG. 3 illustrates components and algorithms associated with the four-corner stroke movement algorithm 102 (FIG. 1). Either the user or the device vendor may change the predefined four-corner rules 112 (FIG. 1). The predefined four-corner rules 112 may include multiple CJK levels (i.e., levels of complexity or strokes having lower frequency). For example, a default rule can specify to use both the Simplified Chinese and Traditional Chinese four-corner dictionaries. An alternate rule can limit use to only a Simplified Chinese four-corner dictionary. Another rule may enable context-awareness whereby the IME 125 (FIG. 1) automatically detects the need for a different dictionary based on the finger movement. At 305 in response to starting a text box 490 (FIG. 4), the operating system of the device 100 loads the IME 125 (both of FIG. 1) at 310. The IME 125 may be activated by hotkey, as a plug-in of a web application. The text box (490) may be associated with an application, such as an email editor, or document composition. For example, upon invoking the IME the text box 490 is empty prior to the selection of a CJK character. IMEs for various languages and indexing mechanisms are known, including those for the four-corner method for CJK. Unlike the current IMEs for CJK that are designed for full-sized keyboards, the IME 125 (FIG. 1) is modified to align the physical touchscreen corners to the four corners of the strokes for each CJK character, thus eliminating the need for a virtual keyboard.

At 315 the IME 125 (FIG. 1) receives the next finger touch event. As shown here on device 100, input is enabled from any of the four corners. When at 320, a touchscreen input corner is activated the IME 125 (FIG. 1) invokes the four-corner movement interpreter 110. At 325 the four-corner movement interpreter 110 determines the direction of the finger movement within the activated corner. At 330 using the stroke indexing table shown in FIG. 2, the IME converts the direction of the finger movement to the associated numeric index value as shown in FIG. 2. Then at 335, the IME 125 (FIG. 1) operates with the four-corner movement interpreter 110 to determine which corner is activated. The IME 125 updates the index buffer 107 (step) 340 with the converted numeric index value.

The CJK four-corner index-character mapping agent 120 uses the contents of the index buffer 107 to search the four-corner index-character dictionary 111 for one or more candidate CJK characters. A search is performed each time the index buffer 107 is updated with a new numeric index value until either one or more candidate characters are located, or until no candidate characters are located when the search is performed using all four numeric index values. Thus, the search may be performed following only the first update, following the first and second update, and so on.

In another embodiment, the position of the converted numeric index value in the index buffer 107 may be based on which corner was activated when the finger touch movement was received. For example, positions "1", "2", "3", and "4" may be associated to the four-corners of the device 100 being top-left, top-right, bottom-left, and bottom-right. The search behavior may be optionally configured in the IME 125. In either embodiment, there is no dependency that the strokes be entered in any particular order.

The four strokes comprising the CJK character are mapped independently and assembled upon completion of input. The four-corner index searching and the CJK character retrieval operations are independent from each other and are performed incrementally. The index buffer 107 is a template for temporarily storing the input numeric stroke index. Each time the index buffer 107 is updated with a new numeric stroke index, the CJK four-corner index-character mapping agent 120 (step 345) uses the updated index buffer 107 as an index to search the four-corner index-character dictionary 111.

As an example, referring to the stroke indexing table in FIG. 2, and assuming the input character is "刘," converting the input strokes to numeric index values and searching the four-corner index-character dictionary 111 may generally be performed as follows. The top-left (first input stroke) is the default stroke, and the index buffer 107 is updated with numeric index value "0." Therefore, input can begin with the top-right corner. This finger touch input stroke is formed top to bottom, which converts to numeric index value "2." Searching the four-corner index-character dictionary 111 returns a list of potential candidate characters (a partial sample is shown):

02 刘
02 刻
02 剂
02 剖
02 彰
02 新
02 瓢

To narrow down the list of potential candidate characters, a finger touch input stroke is formed in the third corner (bottom-left). This right-top to left-bottom direction converts to numeric index value "4." The updated index buffer 107 now contains "024." A search of the four-corner index-character dictionary 111 returns only two potential candidate characters:

024 刘
024 彰

The desired character appears as the first one returned. This character can be committed, or a fourth stroke can be input, in which case only this one character will be returned (刘). In this way, the CJK character "刘" can be input using only two or three finger touch input events.

Continuing at 350, if no matching character is found, then more input is needed to locate a character (step 380). If a search has not yet located the desired CJK character in the four-corner index-character dictionary 111, processing returns to 315 to accept the next finger touch event (i.e., a second, third, or fourth finger touch event). However, if the search is unsuccessful and the index buffer 107 already contains all four numeric index values, then the index buffer 107 is reset (i.e., the contents are removed) prior to returning to 315.

Returning to 350, there may be more than one candidate character (step 355). The CJK four-corner index-character mapping agent 120 may not uniquely identify a CJK character, but may return a short list of possibilities. In some encoding methods, a fifth digit can be added to uniquely identify the character if necessary. Here, at 360 a pop-up displays a candidate list of the non-unique matching characters. If the list is only one page (step 365), and the desired character appears in the list (step 370), the user can select the correct character from the list (step 375). For example, the results for the search for "024" may display on the device 100 as:

1. 刘 2. 彰

Or as:

1. 刘
2. 彰

Or as a pull-down list.

Note that in this example, the CJK four-corner index-character mapping agent 120 returns results based on a search where the index buffer 107 only contains three of the potential four converted numeric index values. The user may tap a circle over a candidate character to select it. The circle may be visible to the user, or may be virtual (invisible). Tapping the circle indicates "enter" or "commit." Upon commit, the selected CJK character is passed from the IME 125 to the application. The IME 125 adds the selected CJK character to the previously-committed CJK characters displayed in the text box 490. The text box 490 is empty if there is no previously-committed CJK character. The text box 490 can be altered if one or more of the previously-committed CJK characters is changed, for example by deletion or selection of a replacement CJK character. The index buffer 107 is reset upon committing a CJK character.

At 385, the selected character is committed, i.e., sent as text input to an application such as an email. Similarly, if only one character is matched at 355, then at 385 the character is committed. The index buffer 107 is reset when the user commits a character.

Returning to 365, if the candidate list is more than one page, the shaking operation feature 130 forward and backward through the candidate pages. If the desired character appears in the next page (step 370), the user can select the correct character from the list (step 375) and commit the character (step 385). If at 370, the displayed list does not contain the desired character, the shaking operation feature 130 advances to the next candidate page. When the desired character is located in the displayed page 370, the user can select the correct character from the list (step 375) and commit the character (step 385).

Figure 4:
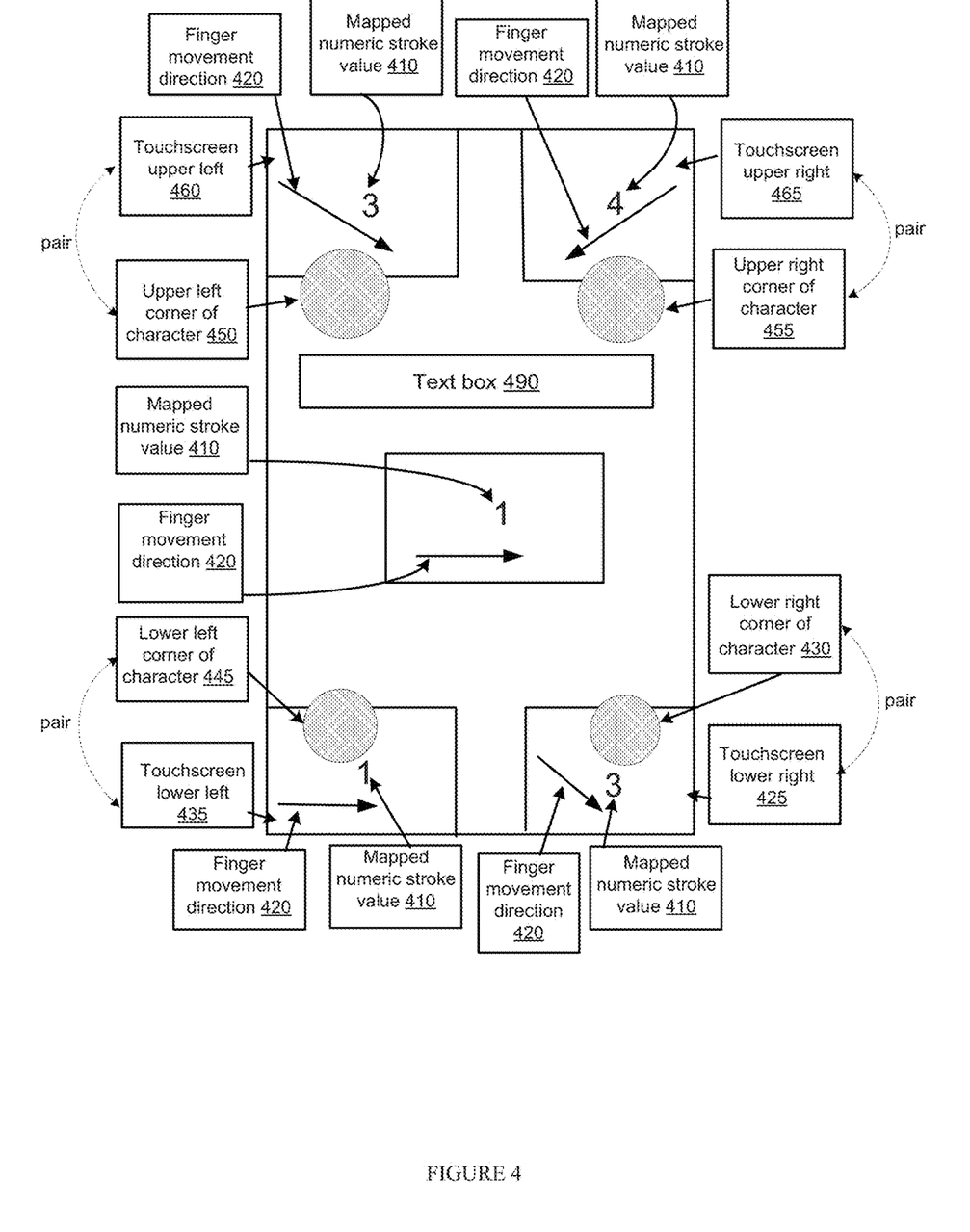
FIG. 4 illustrates pairing the four corners of the device with the four corners of a CJK character, according to various embodiments of the disclosure.

FIG. 4 illustrates pairing the four corners of the device 100 (FIG. 1) with the four corners of a CJK character using the CJK character "法." Each of the physical corners of the touchscreen on device 100 is paired with one of the four corners of the CJK character. As shown the touchscreen upper left corner 460 is paired with the upper left corner of the character 450. Similarly, the remaining three corners form pairs 465/455, 430/425 and 445/435. Finger movement direction 420 indicates the direction of movement to form each of the outer four strokes of the CJK character. Traditionally, the four-corners are referenced from top-left, top-right, bottom-left, and bottom-right. However, the four-corner stroke movement algorithm 102 (FIG. 1) does not require a particular order of entry of the strokes. The mapped numeric stroke value 410 is derived from the four-corner movement interpreter 110 determining the finger movement direction and converting it to a numeric index value, as in the table shown and described with reference to FIG. 2. The text box 490 may include the CJK characters that are committed and sent as input to the application as part of the text composition. This design aligns the touchscreen physical layer attributes to CJK character virtual layer, and visually integrates a software solution into the hardware interface. Such pairing of corner-to-corner relationships allows the system to map each stroke independently (which means parallel ability to handle four strokes separately), and then combine all the stroke indexes into the four-corner index no matter which stroke is input first.

Figure 5:
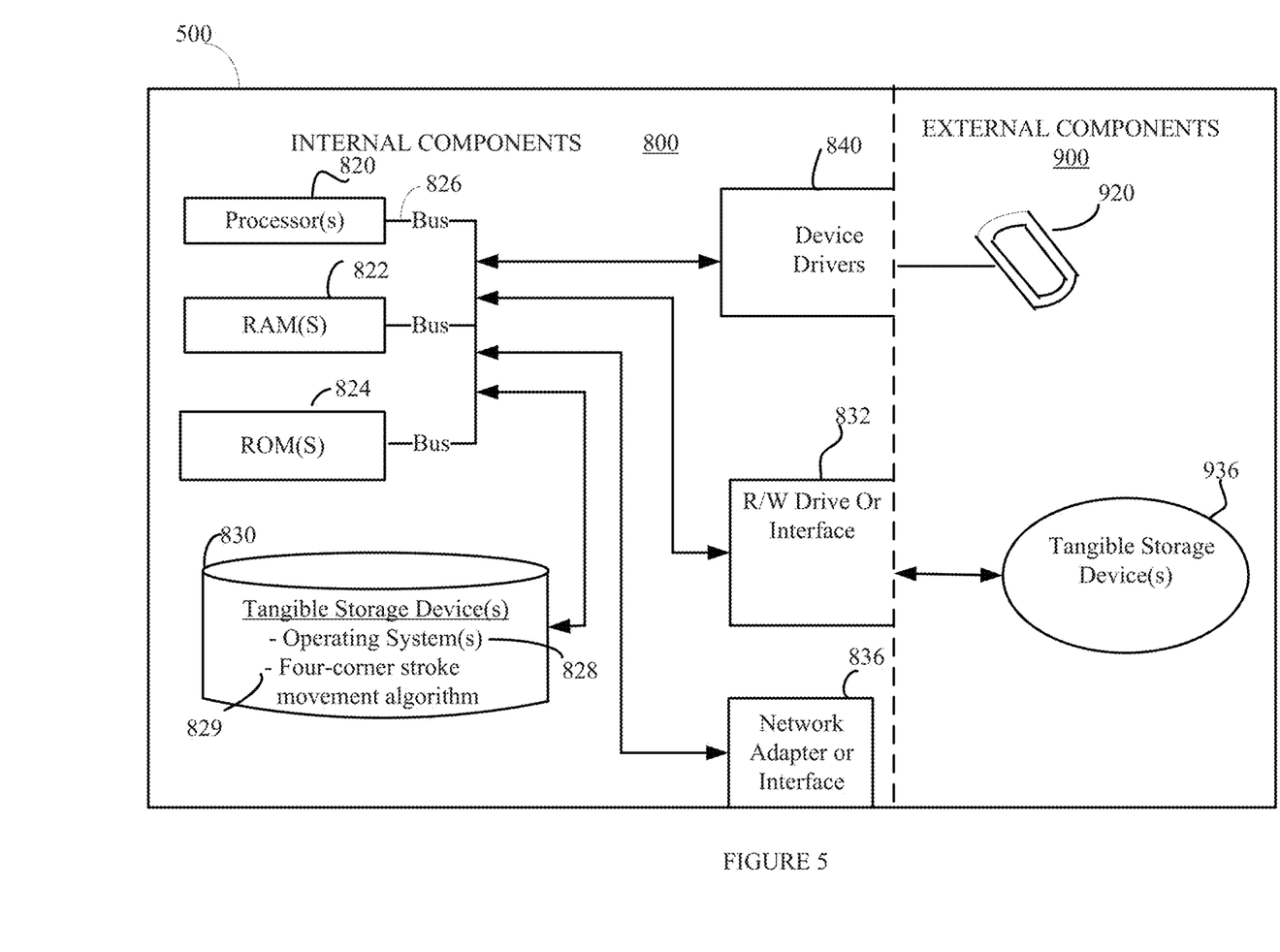
FIG. 5 is a block diagram of hardware and software of the computer environment according to an embodiment of the process of FIG. 3.

FIG. 5 illustrates an exemplary computing device 500 applicable for executing the algorithm of FIG. 3. Computing device 500 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems 828 executing the four-corner stroke movement algorithm, as illustrated in FIG. 3; and one or more computer-readable tangible storage devices 830. The one or more operating systems 828 and the components of the four-corner stroke movement algorithm 829 are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, USB memory stick, and magnetic disk.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 500, can be downloaded to computing device 500 from an external computer (e.g., server) via a network (for example, the Internet, a local area network, or other wide area network) and respective network adapters or interfaces 836. From the network adapters (or switch port adapters) or interfaces 836 and operating system 828 associated with computing device 500 are loaded into the respective hard drive 830 and network adapter 836.

External components 900 can also include a touch screen 920 and pointing devices 930. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method for inputting Simplified and Traditional Chinese, Japanese, ideographic, and Korean (CJK) characters into a touchscreen-enabled device comprising:
   receiving a plurality of finger touch events on the touchscreen-enabled device, wherein each of the plurality of finger touch events forms a stroke that is a component of a written CJK character;
   pairing each of the plurality of finger touch events to a stroke drawing style that is the component of the written CJK character, wherein each corner of four corners of the input device has a default stroke defined such that receiving and pairing begins with a next finger touch event;
   for each pairing, converting a direction of the finger touch event to an associated numeric index value, and updating an index buffer with the numeric index value; and
   upon each updating of the index buffer, searching an index-character dictionary for a CJK character matching the updated index buffer.

2. The method of claim 1, wherein the converting further comprises:
   locating, in a stroke indexing table, the determined finger touch movement direction associated with each of the plurality of finger touch events, and assigning a numeric index value to the located determined finger touch movement direction; and
   in response to locating the determined finger touch movement direction in the stroke indexing table, inserting the assigned numeric index value in the index buffer.

3. The method of claim 1, wherein the finger touch events are entered at each corner of the touchscreen-enabled device in any order, and a corner of the touchscreen-enabled device has no more than one finger touch event, and each finger touch event occupies only one corner of the touchscreen-enabled device.

4. The method of claim 1, further comprising at least one set of predefined four-corner rules, wherein each set of predefined four-corner rules includes one or more character sets, and one or more CJK levels of complexity.

5. The method of claim 4, wherein a scope of the predefined four-corner rules is configurable to include a single CJK character set, a mixture of CJK character sets, and a CJK level of complexity.

6. A computer program product for inputting Simplified and Traditional Chinese, Japanese, and Korean (CJK) characters into a touchscreen-enabled device comprising:
   an input method editor (IME) on the touchscreen-enabled device embodied on a computer readable storage medium, the IME including program instructions executable by a processor, the program instructions comprising:
   program instructions to receive, by the IME, a plurality of finger touch events on the touchscreen-enabled device, wherein each of the plurality of finger touch events forms a stroke that is a component of a written CJK character;
   program instructions to pair each of the plurality of finger touch events to a stroke drawing style that is the component of the written CJK character, wherein each corner of four corners of the input device has a default stroke defined such that receiving and pairing begins with a next finger touch event;
   for each pairing, program instructions to convert a direction of the finger touch event to an associated numeric index value, and update an index buffer with the numeric index value; and
   upon each updating of the index buffer, program instructions to search an index-character dictionary for a CJK character matching the updated index buffer.

7. The computer program product of claim 6, wherein the converting further comprises:
   program instructions to locate, in a stroke indexing table, the determined finger touch movement direction associated with each of the plurality of finger touch events, and
   program instructions to assign a numeric index value to the located determined finger touch movement direction; and
   in response to program instructions to locate the determined finger touch movement direction in the stroke indexing table, program instructions to insert the assigned numeric index value in the index buffer.

8. The computer program product of claim 6, wherein the finger touch events are entered at each corner of the touchscreen-enabled device in any order, and a corner of the touchscreen-enabled device has no more than one finger touch event, and each finger touch event occupies only one corner of the touchscreen-enabled device.

9. The computer program product of claim 6, further comprising at least one set of predefined four-corner rules, wherein each set of predefined four-corner rules includes one or more character sets, and one or more CJK levels of complexity.

10. The computer program product of claim 9, wherein a scope of the predefined four-corner rules is configurable to include a single CJK character set, a mixture of CJK character sets, and a CJK level of complexity.

11. The computer program product of claim 6, wherein the IME receives the plurality of finger touch events without a keyboard.

12. A computer system for inputting Simplified and Traditional Chinese, Japanese, ideographic and Korean (CJK) characters into a touchscreen-enabled device comprising:
one or more processors, one or more computer-readable storage devices, and an input method editor (IME) comprising a plurality of program instructions stored on at least one of the one or more storage devices for execution by at least one of the one or more processors, the plurality of program instructions comprising:
program instructions to receive, by the IME, a plurality of finger touch events on the touchscreen-enabled device, wherein each of the plurality of finger touch events forms a stroke that is a component of a written CJK character;
program instructions to pair each of the plurality of finger touch events to a stroke drawing style that is the component of the written CJK character, wherein each corner of four corners of the input device has a default stroke defined such that receiving and pairing begins with a next finger touch event;
for each pairing, program instructions to convert a direction of the finger touch event to an associated numeric index value, and update an index buffer with the numeric index value; and
upon each updating of the index buffer, program instructions to search an index-character dictionary for a CJK character matching the updated index buffer.

13. The computer system of claim 12, wherein the converting further comprises:
program instructions to locate, in a stroke indexing table, the determined finger touch movement direction associated with each of the plurality of finger touch events, and
program instructions to assign a numeric index value to the located determined finger touch movement direction; and
in response to program instructions to locate the determined finger touch movement direction in the stroke indexing table, program instructions to insert the assigned numeric index value in the index buffer.

14. The computer system of claim 12, wherein the finger touch events are entered at each corner of the touchscreen-enabled device in any order, and a corner of the touchscreen-enabled device has no more than one finger touch event, and each finger touch event occupies only one corner of the touchscreen-enabled device.

15. The computer system of claim 12, further comprising at least one set of predefined four-corner rules, wherein each set of predefined four-corner rules includes one or more character sets, and one or more CJK levels of complexity.

16. The computer system of claim 15, wherein a scope of the predefined four-corner rules is configurable to include a single CJK character set, a mixture of CJK character sets, and a CJK level of complexity.

17. The computer system of claim 12, wherein the IME receives the plurality of finger touch events without a keyboard, wherein the plurality of finger touch events forms a written CJK character.

* * * * *